June 20, 1939. S. M. LEVY 2,163,495
SUN VISOR FOR AUTOMOBILES
Filed Sept. 19, 1938 2 Sheets-Sheet 1
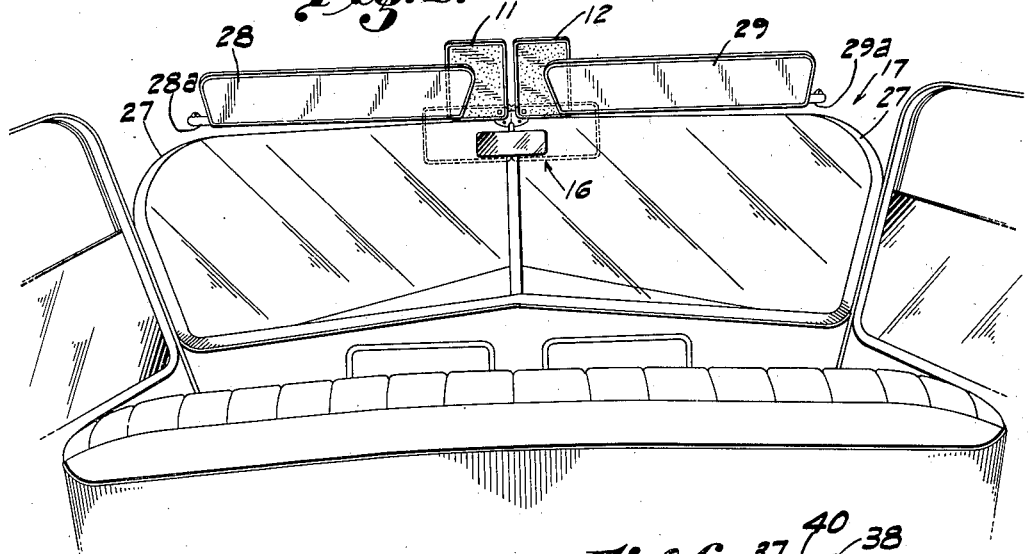
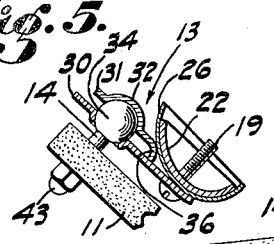
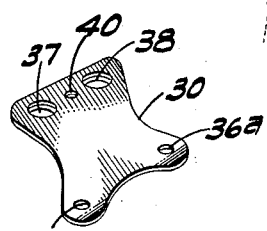
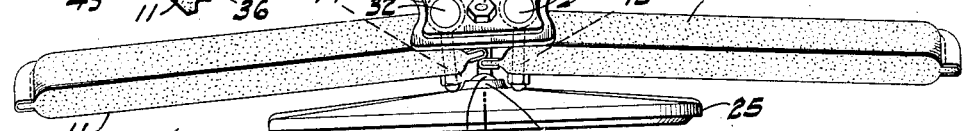
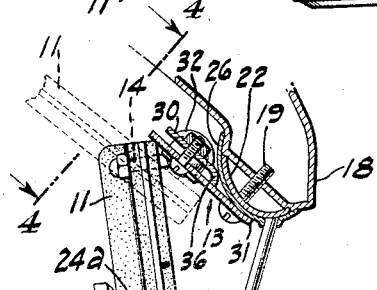
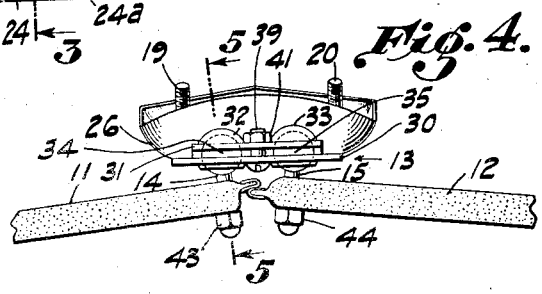
SOLOMON M. LEVY,
INVENTOR.
BY
ATTORNEY.

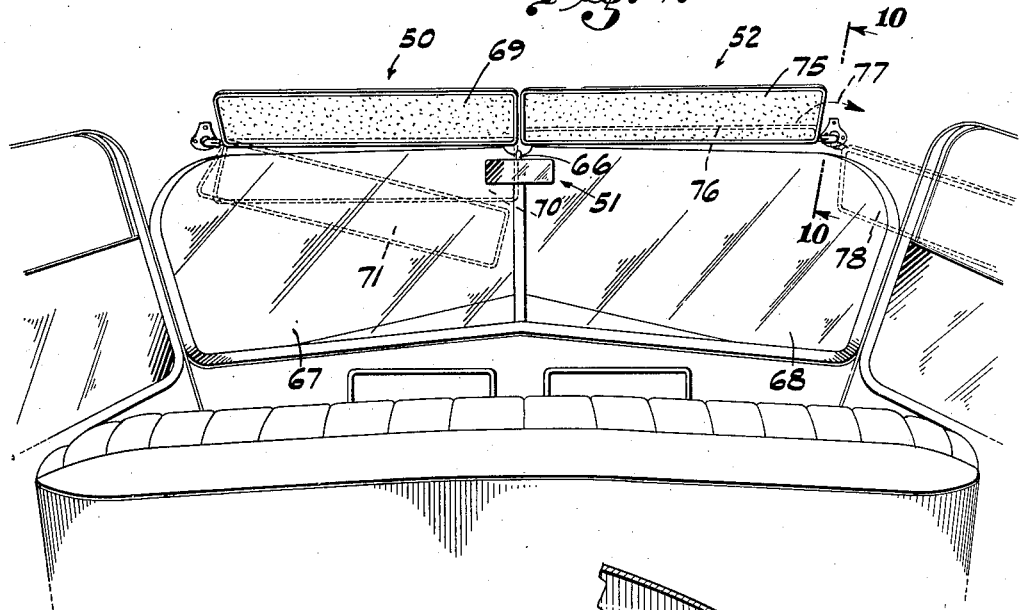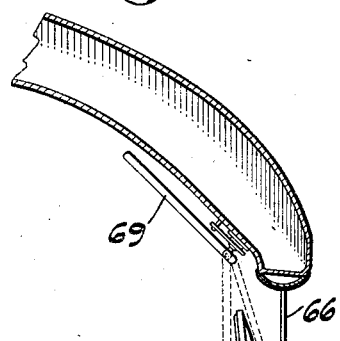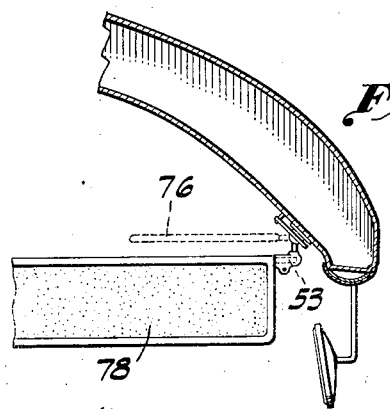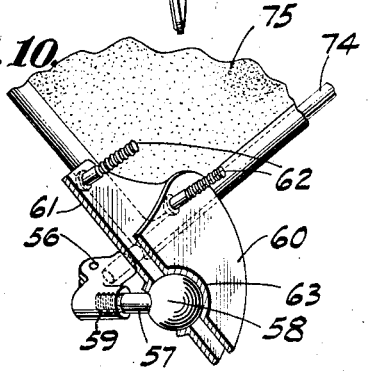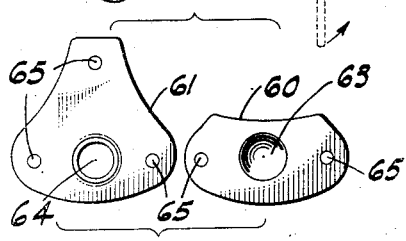

Patented June 20, 1939

2,163,495

UNITED STATES PATENT OFFICE 2,163,495

SUN VISOR FOR AUTOMOBILES

Solomon M. Levy, Los Angeles, Calif., assignor of two-fifths to Leslie W. Bettis, Los Angeles, Calif.

Application September 19, 1938, Serial No. 230,528

9 Claims. (Cl. 296—97)

My invention relates to improvements in sun visors for automobiles.

An important object of the invention is to provide a sun visor for automobiles which is capable of as wide a range of adjustment as that possible by the use of a ball and socket joint, thus making it possible not only to turn the visor about an axis extending through it, but also to move it bodily through a plurality of different planes, this being done in such a manner as to obstruct sun glare in an area which heretofore has remained unshielded.

An important object of the invention is to provide a sun visor for automobiles, said visor being located centrally of the windshield and being adjustable with relation to the rear vision mirror in such a manner as to shield the adjacent area, which is unshielded by the present sun visors at the right and left of the mirror, and which will permit the position of the mirror when once established to continue unchanged and its use to remain always effective.

A still further object of the present invention is to provide a sun visor which will obstruct glare from the front of the vehicle when adjusted rearwardly of the rear vision mirror in an edgewise vertical manner, such adjustments in no way changing the position of said mirror when once definitely set, the visor also being adjustable when it is rotated through a horizontal position, to obstruct glare from the side of the vehicle.

A still further object of the invention is to provide a novel combination of mirror support and sun visor support.

Other objects, features, and advantages of invention will be apparent during the course of the following description:

Automobiles being manufactured today usually come equipped with a single sun visor positioned in the forward portion of the roof of a car in such a manner that it may be adjusted to obstruct sun glare in front of the driver as well as from the side. The car may be delivered or equipped subsequently with an auxiliary visor for shielding sun glare from the occupant of the car.

These visors, however, do not extend in back of the rear vision mirror, and due to the V-shape of the windshield, are inadequate to protect the driver or the occupant of the car from the sun glare which is unshielded in the portion adjacent to that area. Neither is it possible to extend the present visors to a point adjacent the center where the two wings meet at what might be termed the vertex of the intersecting panes, because that would render the rear vision mirror ineffective when said visors are downwardly adjusted to a sun obstructing position; nor can the present visors be manipulated in an edgewise manner in a vertical plane between the mirror and the windshield.

A sun visor structure suited to meet these needs in an improved and superior manner is provided by this invention.

In the accompanying drawings, forming a part of this specification,

Fig. 1 is a perspective view looking from a point rearward of the driver's seat toward the windshield of an automobile equipped with my improved device. In said view, the device is shown in two positions by means of dotted and full lines.

Fig. 2 is a plan view showing the novel combination of sun visor support and mirror support.

Fig. 3 is a section taken on line 3—3 of Fig. 2. In said view, is shown the means by which the device is attached to the frame of the car.

Fig. 4 is a view of the device taken from the view point indicated by the arrows 4—4 in Fig. 3.

Fig. 5 is a section taken on line 5—5 of Fig. 4.

Fig. 6 is a perspective view of one of the parts of the visor supporting bracket.

Fig. 7 is a perspective view similar to Fig. 1, showing another embodiment of the invention.

Fig. 8 is a side elevation of the device looking from the center to the left in Fig. 7, a fragment of the roof of the car being shown.

Fig. 9 is a view similar to Fig. 8, except that the observer is looking in the opposite direction.

Fig. 10 is a fragmental section taken on line 10—10 of Fig. 7.

Fig. 11 is a face view of the ball joint plates, and

Fig. 12 is a perspective view of the visor's ball joint shown in Fig. 10.

Referring now more in detail to the drawings, and having reference first to the form of the invention shown in Figs. 1 to 6, the sun visor of the present invention consists of a dual visor comprising plate like wings 11 and 12. Said wings are adjustably mounted on a bracket 13 by means of bolts 14 and 15, located in adjacent corner portions of said wings, to swing in an edgewise manner in a vertical plane between the rear vision mirror 16 and the windshield 17.

The rear vision mirror 16 is fastened to the frame of the car 18, (see Fig. 3) by means of screws 19 and 20 tapped thereinto, said screws being also utilized to support the bracket 13. The rear vision mirror is of a conventional type. It comprises a dished base plate member 22 having a bent shank 23 provided with a ball 24 which is mounted in a socket bearing 24a in the mirror frame 25. A trim member 26 is disposed between the brackets 13 and plate 22 to cover the exposed portion of the latter plate. Thus it will be seen there is a common support and fastening means for both the visor and the mirror.

The windshield 17 is of the conventional V-type, the vertex of the intersecting panes 27 being located at the mid-length of the mirror in line with the shank 23 thereof.

In Fig. 1, the wings 11 and 12 of the visor are shown in full lines in the inoperative position and in dotted lines in the operative position. In the latter position, the wings are disposed in back of the mirror 16 as shown in Figs. 2 and 3.

In Fig. 3, wing 11 is partially shown in dotted position, in which position it normally rests when manually adjusted to the inoperative position.

In Fig. 1 are shown the usual sun visors 28 and 29. Said visors are mounted to swing up and down about their horizontal longitudinal supports 28a and 29a with their free inner ends each directed towards the center of the car. It will therefore be seen by viewing Fig. 1, the visors 28 and 29 do not extend sufficiently near the center of the car to fully obstruct by themselves sun glare. If they were extended to such a point, they would render the rear vision mirror ineffective for use when they were swung downwardly to a sun obstructing position.

Describing the various details comprising the sun visor structure, the bracket 13 is composed of parts 30 and 31. In Fig. 6, the part 30 is shown in perspective, and its cooperating part 31 is shown in plan in Fig. 4, and in section at different points of its length in Figs. 3 and 5. Part 31 is provided with concavities 32 and 33 in which the ball-heads 34 and 35 of bolts 14 and 15 respectively seat. Part 31 also is furnished with an inturned flange 36, (see Figs. 3 and 5) which abuts the part 30 so as to maintain the remainder of part 31 in a spaced assembled relation to part 30.

Part 30 of the bracket 13 is provided with holes 36a, (see Fig. 6) through which the screws 19 and 20 extend to fasten it to the part 22, and the two parts in turn to the frame 18. Holes 37 and 38 are provided in part 30 (see Fig. 6) to complete the socket joints of which the member having concavities 32 and 33 forms a part.

Bolt 39 is provided to join parts 30 and 31 together. Said bolt is first inserted in the hole 40 of part 30 and then applied to part 31 after the bolts 14 and 15 have been extended through the holes 37 and 38 of part 30.

Should the parts 30 and 31 become loose on account of wear, the nut 41 may be tightened to compensate for the slack thus occasioned. Nuts 43 and 44 are provided to screw onto the bolts 14 and 15 and thereby complete the assembly of which the wings form a part.

When it is desired to install the central visors of this invention on a car, the screws which originally fastened the part 22 to the frame 18 are removed and longer screws 19 and 20 are provided in their place. Thus simply by inserting the screws 19 and 20 through the holes 36a of the bracket 13 and using the original tapped holes in the frame, the complete visor assembly may be quickly and easily installed.

When once installed, the wings 11 and 12 may be manually adjusted from their full line inoperative position to dotted line operative position by simply swinging them in an edgewise manner in reverse directions about their pivotal axes provided by the ball and socket bolts, until their adjacent edges are brought into contiguity at either limit of their swing. Owing to the fact that their operative positions lie rearward of the rear vision mirror, it is not necessary to change the adjustment of the latter when once made.

Now describing the embodiment of the invention shown in Figs. 7 to 12, in Fig. 7, there is shown a visor 50 at the left of the rear vision mirror 51 and a visor 52 at the right thereof. Said visors are similar in every respect with one exception, that being that one is the reverse of the other. Visor 50 is mounted to rotate upon the shaft 53, (see Fig. 10) and the shaft 53 in turn has one end mounted in the split socket 54 provided in the bearing 55 (see Fig. 12), clamping screw 56 being utilized to secure the shaft 53 detachably therein. Bolt 57, having a globular head 58, is screwed into the body portion 59 of the bearing 55, the head 58 providing a ball joint about which the visor 50 may swing in an edgewise manner in certain movements of its swing to and from the inoperative position.

Head 58 is seated within a socket point provided by the cooperating plates 60 and 61, said plates being joined together by screw bolts 62, two of which are shown in Fig. 10. In addition to joining the plates 60 and 61 together, said bolts from time to time may be adjusted to compensate for any wear which may take place between the head 58 and the socket provided by said plates. Plate 60 is provided with a concavity 63 and plate 61 is provided with a scalloped opening 64, (see Fig. 11) said concavity and scalloped opening being brought into juxta-position after the bolt 57 has been inserted and screw bolts 62 applied in the assembled relation of the parts shown in Fig. 10. Holes 65 have the same centers as the brackets which support visors 28 or 29, so that when it is desired to substitute the visor provided by this embodiment of the invention for the visor 28 and the visor 29, all that is necessary is to screw longer screw bolts 62 into the original tapped holes in which the shorter bolts were originally seated.

Mirror 51 is provided with a shank 66 and is mounted in the same relation to the panes 67 and 68 of the windshield as is the mirror 16 already described.

In the operation of the visor provided in this embodiment, the visor 50 is bodily rotated about the shaft 53 from the full line inoperative position 69 to the dotted line position 70, (see Fig. 7). In the latter position, a portion of the visor would render the mirror 51 partially ineffective, and when the visor 52 would be similarly rotated, the entire mirror would be rendered ineffective. Thus it will be seen some means must be provided whereby the visor can be adjusted in an edgewise manner to bring it to the rear of the mirror. This means has been previously set forth in the disclosure relating to the ball and socket joint. Continuing the movement in the operation of the visor after the last position 70 is assumed, the visor is swung in an edgewise manner from position 70 in Fig. 7 to position 71 shown in Figs. 7 and 8. The visor then is rotated on the shaft 53 to a position wherein when it is swung edgewisely in an upward direction it is caused to assume the position 72 between the mirror and the windshield. Thus the edgewise adjustment of a visor wherein in its movement it is caused to take a position between the rear vision mirror and the windshield no matter whether it is pivoted at the center as shown in Fig. 1 or pivoted at the side as shown in Fig. 7, is the common feature on which the two embodiments of the invention are based.

When it is desired to shield the driver or the occupant of the car from the sun at the side of the vehicle, visor 52 will be considered as an example in describing the operation. The visor is first rotated about the shaft 74 from position 75 to position 76 seen in either Fig. 7 or Fig. 9. Visor 52 is then rotated through an angle of 90 degrees about the axis provided by bolt 57 as indicated by the arrow 77 in Fig. 7. At the termination of this 90 degree swing, the visor is swung downwardly in an edgewise manner to the position 78.

If now visor 52 is adjusted to a position similar to the position 72 of visor 52, their inner edges will be brought into contiguity in their operative position.

The fact that the visors 50 and 52 are longer than the visors shown at 28 and 29 results in their more adequately shielding the driver and the occupant from the sun when adjusted to a sun glare obstructing position at the side. A device to secure the result in the efficient manner provided by this embodiment answers a long-felt need.

It should be understood that the present disclosure is for the purpose of illustration only and that this invention includes all modifications and equivalents which fall within the scope of the subject matter claimed.

What I claim is:

1. In a structure of the kind described, the combination, with a vehicle having a windshield mounted thereon and a rear vision mirror located in a rearwardly spaced relation to the central portion of said windshield; of a pair of plate-like visors, and means whereby said visors are mounted to swing in an edgewise manner between said mirror and said windshield from an upstanding position wherein adjacent edges of said visors are in a contiguous parallel position to a pendant position wherein their adjacent edges are in a like relation.

2. In a structure of the kind described, a rear vision mirror having a shank portion, a support for said shank portion, a visor, a bracket to which a corner portion of said visor is fastened to swing in a vertical plane rearwardly of said mirror, and common means fastening said bracket and said support to the frame of an automobile, whereby an edge portion of said visor may be edgewisely swung from an inoperative position through a right angle into an operative abutting relation to the shank of said mirror.

3. A sun visor comprising a pair of wing members, a support, a mirror provided with a shank fastened to said support, and means to pivot adjacent corners of said wing members to said support whereby they may be swung in an edgewise manner in opposite directions while maintaining them in a non-overlapping relation, from an upstanding to a pendant position, bringing adjacent edges of said wings into contiguity and parallelism with each other in both of said positions.

4. The combination with a rear vision mirror for an automobile having a shank for supporting said mirror in spaced relation with the central portion of a windshield, and a support for said shank; of a visor comprising a pair of wings each including a ball-head bolt, a bracket fastened to said shank support for supporting said wings, said bracket comprising cooperating plates providing socket joints in which the ball-headed bolts of said wings are mounted, whereby to swing said wings, bringing certain edges thereof into contiguity rearward of said mirror, and means for adjusting the relation of said cooperating plates.

5. The combination with a rear vision mirror having a shank supporting it in a rearwardly spaced relation to the vertex of the intersecting panes of a V-type windshield of an automobile; of a pair of visors for shielding the glare in the area of the windshield adjacent to said mirror, and means to mount said visors in a glare obstructing position with relation to said windshield on both sides of said vertex wherein certain edges of each visor at the limit of their swing are brought into registry with said shank intervening between them.

6. The combination with a rear vision mirror having a shank affording a supporting means mounted on an automobile adjacent the vertex of the intersecting panes of a windshield; of a pair of visors having edge portions adapted to be brought into contiguity between said mirror and said windshield on opposite sides of said shank, a mounting means for each of said visors comprising a pair of plates providing between them a socket joint, and a bolt fastened to a corner portion of each visor, said bolt having a spherical head mounted in said joint, and a support for said plates fastened to said supporting means.

7. A rear vision mirror provided with a shank supported by the frame of an automobile centrally of the windshield thereof, and a visor comprising a pair of wing members supported by a bracket depending from said shank support, means pivoting adjacent corner portions of said wings to said bracket to reversely swing them edgewisely in opposite directions whereby at the operative limit of their swing, adjacent edges thereof are brought into contiguity between said mirror and windshield with said shank intervening between them.

8. In a device of the kind described, a support adjacent a windshield of an automobile, a mirror provided with a shank fastened to said support, a bracket fastened to said support, a pair of oppositely juxtaposed swinging visors, pivot means comprising a ball and socket joint to fasten each of said visors to said bracket to operate in reverse directions in a vertical plane between said mirror and said bracket whereby adjacent edges thereof are brought into contiguity at the limit of their swing in opposite directions.

9. A bracket comprising a pair of plates, there being a concavity in one plate and a scalloped opening in the other plate, said concavity and opening having concentric centers when said plates are assembled, a bolt having a ball-shaped head, said bolt extending through said opening and having the outer portion of its head resting in said concavity and the portion of said head adjacent the stem of said bolt occupying said opening, means joining said plates in a spaced relation to one another with said ball head gripped between them, a visor having a corner portion mounted upon said bolt, said plate which is provided with said concavity having a flange adapted to abut its companion plate to maintain the spaced relation of said plates when they are cooperatively joined together, a rear vision mirror having a shank portion, a support for said shank portion, and common means fastening said bracket to said support and said combined bracket and support to the frame of an automobile, whereby an edge portion of said visor may be edgewisely swung from an inoperative position through a right angle into an operative abutting relation to the shank of said mirror.

SOLOMON M. LEVY.